United States Patent
Sasaki et al.

(10) Patent No.: US 9,385,924 B2
(45) Date of Patent: Jul. 5, 2016

(54) ASSISTANCE SYSTEM

(75) Inventors: Hiromi Sasaki, Kyoto (JP); Hiroshi Yoshida, Shiga (JP); Shintaro Iwamura, Shiga (JP); Masaki Namie, Osaka (JP)

(73) Assignee: OMRON CORPORATION, Kyoto (JP)

( * ) Notice: Subject to any disclaimer, the term of this patent is extended or adjusted under 35 U.S.C. 154(b) by 201 days.

(21) Appl. No.: 14/005,305

(22) PCT Filed: Mar. 23, 2011

(86) PCT No.: PCT/JP2011/057011
§ 371 (c)(1),
(2), (4) Date: Nov. 21, 2013

(87) PCT Pub. No.: WO2012/124161
PCT Pub. Date: Sep. 20, 2012

(65) Prior Publication Data
US 2014/0075320 A1    Mar. 13, 2014

(30) Foreign Application Priority Data

Mar. 15, 2011   (JP) .................................. 2011-056398

(51) Int. Cl.
*G06F 3/048* (2013.01)
*H04L 12/24* (2006.01)
*H04L 12/40* (2006.01)

(52) U.S. Cl.
CPC ................ *H04L 41/22* (2013.01); *H04L 12/40* (2013.01); *H04L 41/145* (2013.01); *H04L 2012/4026* (2013.01)

(58) Field of Classification Search
None
See application file for complete search history.

(56) References Cited

U.S. PATENT DOCUMENTS

| | | | | |
|---|---|---|---|---|
| 5,790,119 A | * | 8/1998 | Sklut | G06F 3/1296 399/82 |
| 2009/0171629 A1 | | 7/2009 | Hirose | |
| 2012/0144364 A1 | * | 6/2012 | Lau et al. | 717/103 |

FOREIGN PATENT DOCUMENTS

| | | |
|---|---|---|
| JP | 11-168483 | 6/1999 |
| JP | 2001-7837 | 1/2001 |

(Continued)

OTHER PUBLICATIONS

International Search report for PCT/JP2011/057011, mail date is Jun. 21, 2011.

(Continued)

*Primary Examiner* — William Trapanese
(74) *Attorney, Agent, or Firm* — Greenblum & Bernstein, P.L.C.

(57) ABSTRACT

Provided is a design assistance system that enables even a user having no expert knowledge to easily design a network system taking into consideration the types of port connection interfaces. The design assistance system has a storage section for storing slave information data in which unique information of the slave device is described; an acquisition section for acquiring information of a connection interface of a port of the slave device from the slave information data; and a generation section for generating a device component serving as a GUI component representing the slave device based on the slave information data, generates a line component serving as a GUI component representing connection of the ports of the slave devices in different aspects in accordance with different types of the connection interface, and generates a design assisting GUI having a topology display screen configured to display the topology of the network system.

14 Claims, 12 Drawing Sheets

(56) References Cited

FOREIGN PATENT DOCUMENTS

| | | |
|---|---|---|
| JP | 2010-10997 | 1/2010 |
| JP | 2010-218083 | 9/2010 |
| JP | 2010-272034 | 12/2010 |
| WO | 2008/001704 | 1/2008 |

OTHER PUBLICATIONS

U.S. Appl. No. 14/005,324 to Hiromi Sasaki et al., filed Sep. 16, 2013.

U.S. Appl. No. 14/005,356 to Hiromi Sasaki et al., filed Sep. 16, 2013.

* cited by examiner

ASSISTANCE SYSTEM

TECHNICAL FIELD

The invention relates to a design assistance system.

BACKGROUND ART

In factory automation, production facilities placed in a factory are controlled by a field network over which various types of slave devices which collect and control data of the production facilities and a master device which conducts central control on these slave devices are connected to each other via a communication bus. FIG. 13 is a diagram showing an example of configuration of the field network. In FIG. 13, a field network 100 is built if a master device 200 (programmable logic controller: PLC) and a plurality of slave devices 300 are connected to each other directly or indirectly via a cable 400 or an I/O unit 500 that is included in each of the devices 300. The slave devices 300 may each include a power supply unit, a motor unit, a counter unit, an image unit, a communication unit, an I/O unit, etc. The communication bus may take on various topologies such as a line, a daisy chain, a tree, and a start, depending on the standard of the field network. To the master device 200, a management device 600 may be connected which is used by a user to set operations of the master device 200, display operation states of the field network 100, and design a network system. The management device 600 is made up of a personal computer etc. in which setting tools are installed.

Patent Document 1 describes a technology to enable handling a new apparatus or network that cannot be handled with the existing configuration editor without greatly changing the design devices of a system made up of a network and a PLC.

Patent Document 2 describes a technology to, in a data communication device connectable to a network including a plurality of apparatuses, search for the apparatus that can additionally be connected on the basis of information about communication ports of the apparatus and provide display for identifying the searched apparatus.

Patent Document 3 describes a technology to build a topology by automatically deciding where the topology has loops and solving the loops, which are recognized as being disconnected.

Patent Document 4 describes a technology to, based on connection information which indicates a cable connection relations about a plurality of connection ports with the other devices, identify the connection port to which a cable should be connected and light up a lighting portion mounted for each of the connection ports such that the identified connection port may be distinguished from the others.

PRIOR ART DOCUMENTS

Patent Documents

Patent Document 1: JP 2010-272034 A
Patent Document 2: JP H11-168483 A
Patent Document 3: JP 2001-7837 A
Patent Document 4: JP 2010-10997 A

SUMMARY OF THE INVENTION

Problems to be Solved by the Invention

In some cases, an industrial network system has a plurality of types of interfaces between connection ports. For example, an EtherCAT-standard device has two types of connection interfaces, namely an external bus (RJ45) and an internal bus (E-Bus) for its connection ports, so that the ports having the different types of connection interfaces cannot be connected to each other. Therefore, in design of the industrial network system, it is necessary to take into consideration the types of the connection port interfaces. However, the conventional design assistance system might find it difficult to grasp information about the types of the connection port interfaces. In a case where a user having no expert knowledge or experiences of SEs designs a network system or builds a real machine, a problem occurs in that such a design assistance system cannot easily design a network system that meets requirements of the user.

In view of the problems, the invention has been developed, and it is an object of the invention to provide a design assistance system by which even a user having no expert knowledge can easily design a network system that takes into consideration the type of the connection interface for the ports.

Means for Solving the Problem

The invention provides a design assistance system for assisting design of a network system in which at least one slave device joins to a communication bus drawing a line, tree, or star topology from a master device as a starting point, the network system being formed by interconnecting ports of each of the master and slave devices, the design assistance system including:

a display configured to display a design assisting GUI;

a control device configured to control the GUI which is displayed on the display; and an input device configured to permit a user to input a command configured to operate the GUI, wherein the control device includes:

a storage section configured to store slave information data in which unique information of the slave device is described;

an acquisition section configured to acquire information of a connection interface of a port of the slave device from the slave information data; and a generation section configured to generate a device component serving as a GUI component representing the slave device based on the slave information data, generate a line component serving as a GUI component representing connection of the ports of the slave devices in different aspects in accordance with different types of the connection interface, and generate a design assisting GUI having a topology display screen configured to display the topology of the network system under design which is built by connecting the device components to each other with the line component.

By the design assistance system, the line component representing interconnection of the ports of the slave devices on the topology display screen is displayed in the different aspects in accordance with the different types of the port connection interface, so that the user can easily identify differences in the port-to-port connection interface. When permitting a new slave device to join to the network system under design, the user can easily know the type of a communication bus of a join destination, to efficiently perform an operation to select the slave device having the connection interface compatible with the communication bus of the join destination. Therefore, according to the design assistance system, the user can easily design a network system in which a plurality of types of communication buses are mixed.

The present invention can be identified as a design assistance system including at least some of those sections and also can be identified as a program to cause a computer to function as the design assistance system or a computer-readable recording medium in which the program is recorded. Moreover, the invention can be identified also as a design assistance method including at least some of processing pieces performed by those sections. Those processing pieces and sections can be combined arbitrarily as long as no technical conflicts occur.

For example, a program according to the invention assists design of a network system in which at least one slave device joins to a communication bus drawing a line, tree, or star topology from a master device as a starting point, is the network system being formed by interconnecting ports of each of the master and slave devices and, if executed by a computer having a display configured to display a design assistance GUI and an input device configured to permit a user to input a command configured to operate the GUI, the program causes the computer to function as a storage section configured to store slave information data in which unique information of the slave device is described; an acquisition section configured to acquire information of a connection interface of a port of the slave device from the slave information data; and a generation section configured to generate a device component serving as a GUI component representing the slave device based on the slave information data, generate a line component serving as a GUI component representing connection of the ports of the slave devices in different aspects in accordance with different types of the connection interface, and generate a design assisting GUI having a topology display screen configured to display the topology of the network system under design which is built by connecting the device components to each other with the line component.

A design assistance method according to the invention assists design of a network system in which at least one slave device joins to a communication bus drawing a line, tree, or star topology from a master device as a starting point, the network system being formed by interconnecting ports of each of the master and slave devices, the design assistance method causing a computer having a display configured to display a design assistance GUI and an input device configured to permit a user to input a command configured to operate the GUI to perform the steps of: storing slave information data in which unique information of the slave device is described; acquiring information of a connection interface of a port of the slave device from the slave information data; and generating a device component serving as a GUI component representing the slave device based on the slave information data, generating a line component serving as a GUI component representing connection of the ports of the slave devices in different aspects in accordance with different types of the connection interface, and generating a design assisting GUI having a topology display screen configured to display the topology of the network system under design which is built by connecting the device components to each other with the line component.

Effects of the Invention

According to the invention, even a user having no expert knowledge can easily design a network system that takes into consideration the type of a connection interface for ports.

MODE FOR CARRYING OUT THE INVENTION

Figure 1:
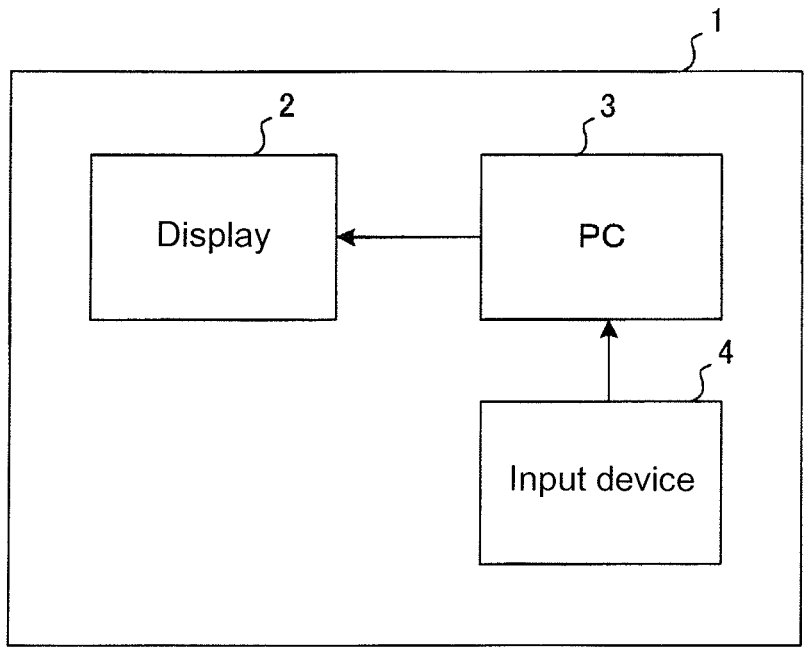
FIG. 1 is a block diagram showing an outlined configuration of a design assistance system according to an embodiment.

FIG. 1 is a block diagram showing the outlined configuration of a design assistance system according to the embodiment. The design assistance system is configured to assist design of a network system in which at least one slave device joins to a communication bus which draws a line, tree, or star topology from a master device as a starting point. The network system is an industrial field network formed by interconnecting ports of each of the master and slave devices and can be illustrated as, for example, an EtherCAT-standard network system. The EtherCAT network system has two types of connection interfaces provided to the slave device, namely an external bus (RJ45) and an internal bus (E-Bus). The design assistance system of the present embodiment is not limited in application to design of an EtherCAT network system, and the port connection interface may be of any types other than the external and internal types.

A design assistance system 1 has a display 2 which displays a design assistance graphical user interface (GUI), a personal computer (PC) 3 which controls the GUI displayed on the display 2, and an input device 4 which is configured by a keyboard or mouse with which a user provides the PC 3 with commands to operate the GUI. The design assistance system 1 enables the user to design a network system off-line. The design assistance system 1 may be configured in a manner such that the user can input commands to a network system on-line by connecting it to a real machine of this network system, for example, a master device (PLC).

Figure 2:
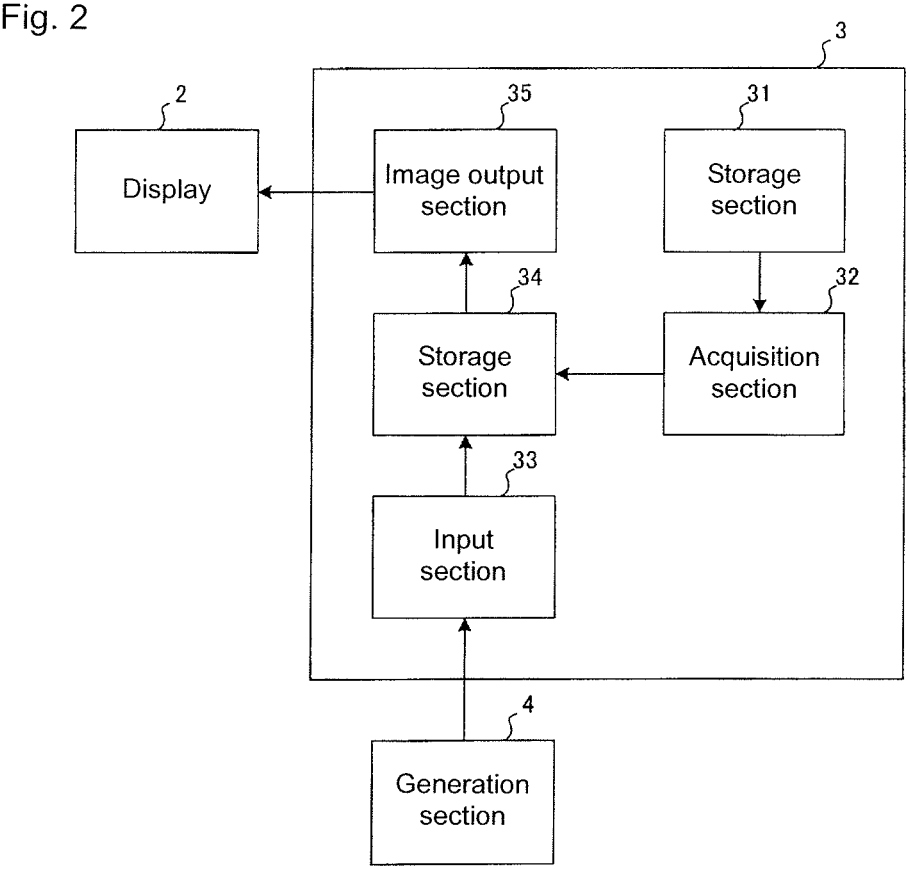
FIG. 2 is a block diagram showing an outlined functional configuration of a PC according to the embodiment.

FIG. 2 is a block diagram showing an outlined functional configuration of the PC 3. The PC 3 has a storage section 31, an acquisition section 32, an input section 33, a generation section 34, and an image output section 35.

The storage section 31 stores slave information data in which unique information of the slave device is described. The slave information data describes a model number of the slave device, identification information of a vendor, information of ports of the slave device in, for example, an XML format.

The acquisition section 32 acquires the information of the slave device ports from the slave information data stored in the storage section 31. The information of the ports contains, for example, the number of the ports of the slave device, the type of a port connection interface (internal bus or external bus), and the identification information (name etc.) of the ports.

The input section 33 receives a signal incoming from the input device 4 and provides the generation section 34 with a command.

The generation section 34 generates a design assistance GUI in response to a command input from the input section 33. Further, the generation section 34 generates image data that can be displayed on the display 2 based on data of the generated GUI and outputs it to the image output section 35. The GUI generated by the generation section 34 will be described later.

The image output section 35 outputs to the display 2 image data input from the generation section 34.

The PC 3 includes publicly known components such as a CPU, a memory, a disk, various types of input/output interfaces, and a bus connecting them, which are not shown, so that the storage section 31 is made up of an ROM, an RAM, or a hard disk drive (HDD) which is connected to the CPU via the bus. The acquisition section 32 and the generation section 34 are realized when the CPU reads a network system design assistance program installed in the HDD etc. from a disk and executes the program. The input section 33 and the image output section 35 are each made up of a mouse connection terminal, a keyboard connection terminal, and a display connection terminal, each of which is connected to the CPU via the bus.

Figure 3:
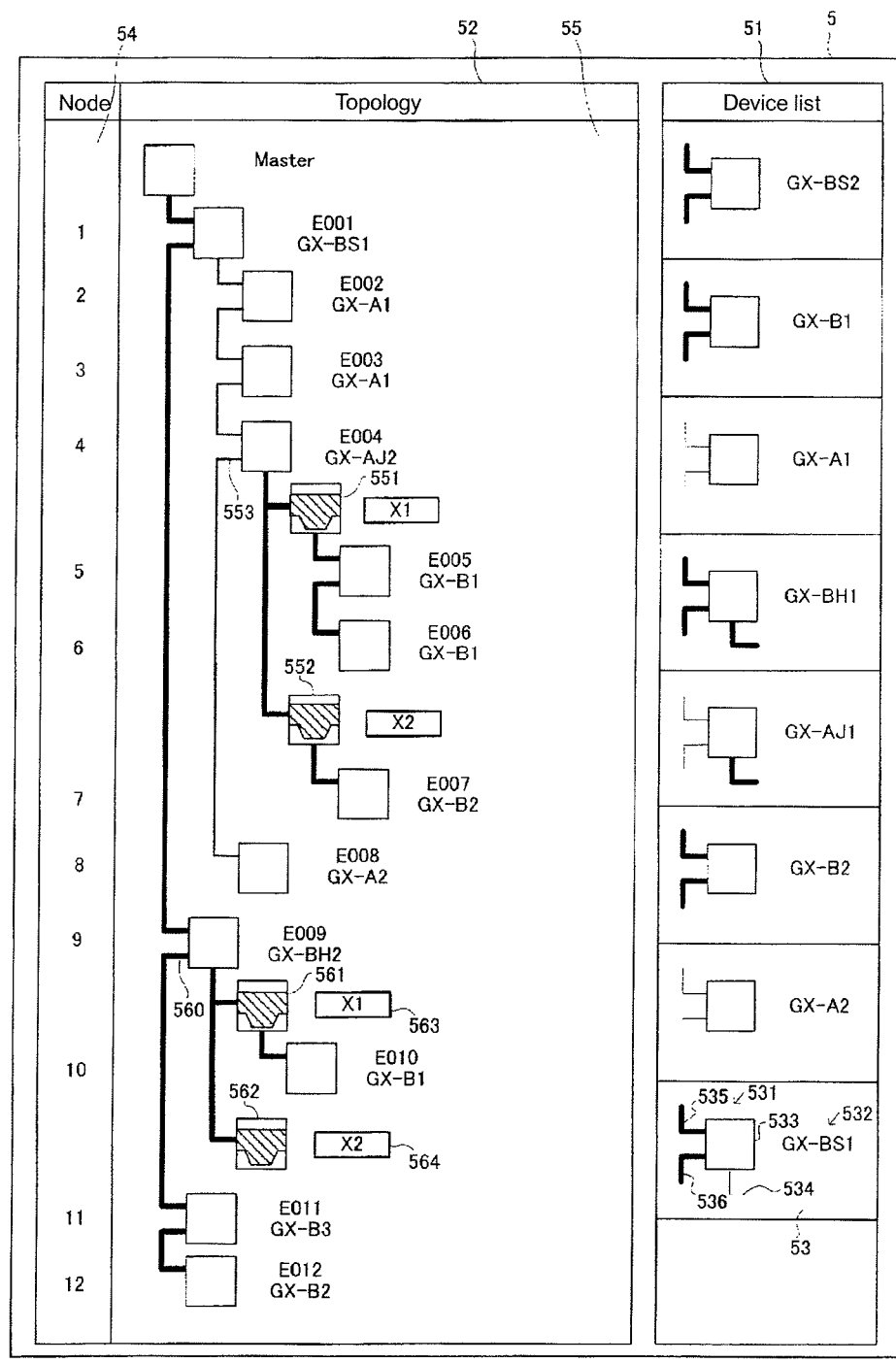
FIG. 3 is a view showing one example of a design assistance GUI generated by the design assistance system according to the embodiment.

FIG. 3 is a view showing one example of a design assistance GUI generated by the generation section 34 in the PC 3. A design assistance GUI 5 of the present embodiment roughly includes two panes, namely a device list display screen 51 and a topology display screen 52. The GUI 5 could include various screens not shown in FIG. 3 such as a screen for setting the master and slave devices, a screen for programming, and a screen for display detailed specifications of the slave device, which are omitted in the present embodiment for simplification of explanation.

The device list display screen 51 is configured to display a list of the slave devices that can join to a network system under design. Item components 53 enumerated on the device list display screen 51 each include a text 532 and a device component 531 serving as a GUI component that represents the slave device.

The device component 531 includes an icon component 533 given as an illustration etc. which visualizes a slave device type or a manufacturer name and line components 534, 535, and 536 which represent ports of the slave device.

Each of the line components represents each of the ports, the number of the line components represents the number of the ports of the slave device, and the color or the line type of the line component represents the type of a connection interface for each of the ports. In this case, it is assumed that a bold line represents a connection interface for the external bus and a thin line represents that for the internal bus. Further, the line component represents an inport or an outport, depending on where the line component is positioned. An inport is used to connect the slave device closer to the master device than the local terminal in a topology, while an outport is used to connect the slave device closer to the master device than the local device in the topology. In this case, it is assumed that the line component 535 which extends from the left side of the icon component 533 and then upward represents an inport, while the line component 536 which extends from the left side of the icon component 533 and then downward represents an outport. Further, in the case of the device component representing a branching slave device having a branching port at which the communication bus branches off, the branching port is represented by the line component positioned to the bottom of the icon component. The slave device represented by the device component 531 is a branching slave device having a branching port at which an external bus branches off to an internal bus. As shown in the figure, the line component 534 representing a branching port for branching to internal bus is positioned to the bottom of the icon component 533. The text 532 indicates the model number of the slave device or the name of a vendor.

By watching the device component 531, the user can know that this slave device is an external bus-connected branching slave device having one branching port for the internal bus and has a model number of "GX-BS1".

By watching the device list display screen 51, the user can obtain information such as the vendor name and the model number of the slave device that can be newly jointed to a network system under design, the number of its ports, and the type of a connection interface for the ports. In particular, the user can easily know the type of the connection interface for the port of the slave device and whether a branching port exists, so that by a GUI having the device list display screen 51, it is possible to easily assist selecting slave devices that can be newly jointed to the network system under design and selecting connection-destination slave devices.

The method of displaying a list of the slave devices on the device list display screen 51 is not limited to that described above. For example, it may be considered to provide a display aspect to further enrich information display for each slave device by increasing the number of GUI components given as the item components 53 or a display aspect to improve listing performance by decreasing the number of GUI components given as the item components 53. Further, another display aspect may be possible to narrow down the item components to be displayed by using keywords input by the user such as a vendor name, and a category (analog I/O, digital I/O, encoder, or sensor).

For example, in the display aspect to improve listing performance, only the icon component 533 is employed as the device component 531 given as the item component 53, omitting the line components 534, 535, and 536. In this case, if operations (movements of a focus frame through mouse clicking or cursor key operations) are performed by the user to select the item component 53 on the device list display screen 51, texts indicating detailed information of the rich device components 531 including the line components 534, 535, and 536 and the selected slave device may be displayed in another window or display region.

The topology display screen 52 is used to display the topology of a network system under design. On the topology display screen 52, one of the device components representing the slave devices of the network system under design and one of the port components representing the ports of the slave devices of the network system under design are each disposed in each row. Each of the rows has two columns. If the component disposed in each row is a device component representing the slave device, the left side column 54 displays the node address of this slave device. The right side column 55 displays texts that indicate identification information (names, model numbers, etc.) of the device components, port components, line components interconnecting these components, and slave devices.

On the topology display screen 52, with respect to the device component representing a certain slave device, the device component representing the parent slave device (slave device connected to an inport) of this slave device is disposed in an upper row and the device component representing the child slave device (slave device connected to an outport or a branching port) of this slave device is disposed in a lower row. In the highest row, the device component representing the master device is displayed. On the topology display screen 52 generated by the design assistance system of the present embodiment, a parent-child relationship of the slave device is indicated by a difference in rows in which the device component is disposed, so that the user can easily know the parent-child relationship of the slave device in the network system under design, namely connection order.

The example has been described of indicating the slave devices' parent-child relationship by disposing the device component representing the parent slave device and the device component representing the child slave device onto the vertical opposite sides in condition where the device component representing the local device is sandwiched by these device components. However, as long as the device component representing the parent slave device and the device component representing the child slave device are disposed on the opposite sides with respect to the device component representing the local device, the direction, for example, right-and-left direction is not limited in which the device components representing the parent and child slave devices are disposed with respect to the local device.

On the topology display screen 52, a group of the device components representing a plurality of the slave devices in a serial parent-child relationship forming a line topology by interconnecting the inports and the outports are disposed uniformly (in the same row) vertically. Further, the row in which the device components representing the branching devices and the device components representing the slave devices connected to the outports of these branching devices are disposed is different from the row in which the device components representing the slave devices connected to the branching ports of these branching slave devices are disposed.

For example, a slave device E001 is a branching slave device having one branching port for branching from the external bus to the internal bus.

A device component representing branching slave devices E001, a device component representing slave devices E009 connected to the outports (external bus) of the branching slave devices E001, and device components representing slave devices E011 and E012 in a serial parent-child relationship with the slave device E009 are disposed in the same column (assumed to be the first column). Further, a device component representing the slave devices E002 connected to the branching ports of the branching slave device E001 and device components representing slave devices E003, E004, and E008 in a serial parent-child relationship with the slave device E002 are disposed in the same column (assumed to be the second column). The second column is disposed as shifted to the right side of the first column. The column, referred to here, corresponds to a "hierarchy" in the invention.

On the topology display screen 52 generated by the design assistance system of the present embodiment, a group of the slave devices joining to a bus branching in the branching slave device are represented by a difference in column, so that the user can easily know the branching of the bus in the network system under design.

The topology display screen 52 displays the port components as GUI components representing the ports provided to the slave devices. On the topology display screen 52 generated by the design assistance system of the present embodiment, as the GUI components representing the ports, especially only the port components representing a plurality of branching ports provided to the branching slave device are displayed.

For example, the slave device E004 is a branching slave device provided with two branching ports for branching from the internal bus to the external bus, so that port components 551 and 552 representing the branching ports are displayed. The port components 551 and 552 enable the user to recognize the two branching ports for connection to the external bus, the branching ports being provided to the slave device E004, on the topology display screen 52. Although the port components representing the outports (connection for the internal bus) of the slave device E004 are not displayed, the device components representing the slave device E004 are, as described above, arranged to include the line components displayed in the different aspects in accordance with the different types of the connection interfaces, so that the user can recognize the outports provided to the slave device E004 by line components 553 representing the outports for internal bus connection. Further, the slave device E009 is a branching slave device having two branching ports for branching from the external bus to the external bus. The slave device E009 displays port components 561 and 562 representing branching ports. Further, the outports for external connection are represented by line components 560.

The topology display screen 52 displays GUI components that indicate identification information of the branching ports in addition to the port components. The identification information represents, for example, names of the ports. In the example of the slave device E009, in addition to the port component 561, a label component 563 is displayed that indicates "X1" as the name of a branching port represented by this port component. Further, in addition to the port component 562, a label component 564 is displayed that indicates "X2" as the name of a branching port represented by this port component. Accordingly, the user can identify the two branching ports of the slave device E009 by name on the topology display screen 52.

In the case of the branching slave device not provided with a plurality of the branching ports as in the case of the slave device E001, no port components are displayed which are used as independent GUI components for the purpose of representing the branching ports. However, as described above, the ports and the connection interfaces provided to the slave device are represented by line components included in the device component, so that even if no port components are displayed, the user can identify the inports, outports, and branching ports on the topology display screen 52.

On the topology display screen 52 generated by the design assistance system of the present embodiment, in addition to a device component representing a branching slave device provided with a plurality of branching ports, port components independent of the device component representing the branching ports are displayed, so that the user can clearly identify the ports to which the slave device is to be connected, to design a network system.

For example, the design assistance system of the present embodiment is well suited for design of an EtherCAT network system; however, EtherCAT changes order in which frames transmitted from the master device are processed, in accordance with which port of the branching slave device the slave device is to be connected. In a case where a network is designed to perform slave-to-slave communication in a concept by which results of processing by a slave device on the upstream side are used by a slave device on the downstream side, the order in which the slave devices process the frames is especially important. If a branching port of the real machine of a branching slave device describes identification information equivalent to that which can be acquired from slave information data, when assembling an actual network, the user can connect the slave devices as intended in design, avoiding a mistake of selecting a wrong connection-destination port.

Only if a branching slave device is provided with a plurality of branching ports, the port components representing those branching ports are to be displayed on the topology display screen 52 of the present embodiment. However, some or all of the inports, outports, branching ports of each of the slave devices may be displayed.

On the topology display screen 52, the topology of a network system under design is indicated by connecting the device components and the port components by using line components representing interconnection between the ports provided to the slave devices. The color or the line type of the line components represents the type of the port connection interface. As described above, in the present embodiment, it is assumed that the line component indicated by a bold line represents interconnection between the ports for connection to the external bus and the line component indicated by a thin line represents interconnection between the ports for connection to the internal bus. The device component representing a branching slave device and the port component representing a branching port provided to this branching device are also connected using a similar line component. That is, on the topology display screen 52, interconnection between the ports provided to the slave device and connection to the branching port inside a branching slave device are represented by the similar line component.

By the topology display screen 52 configured by connecting the device components and the port components with the line components, the user can easily know the topology of the network system. In particular, it is possible to clearly identify which port of a branching slave device causes bus branching, well suitably assisting design of a network that takes into consideration the order in which the slave devices process data.

The design assistance GUI described above is generated by the generation section 34 based on information of the slave devices which is acquired from the acquisition section 32. The acquisition section 32 acquires unique information of the slave devices (vendor name, model number, the number of ports, port connection interface, port name, etc.) from the slave information data stored in the storage section 31 and transmits the unique information to the generation section 34. The slave information data may contain image data that can be used as the icon component 533 of the device component 531. Based on the unique information of the slave devices received from the acquisition section 32, the generation section 34 generates device components representing the slave devices, line components for representing ports composing the device components, line components representing interconnection between the slave devices composing a network system, port components representing branching ports provided to a branching slave device, etc.

Figure 4:
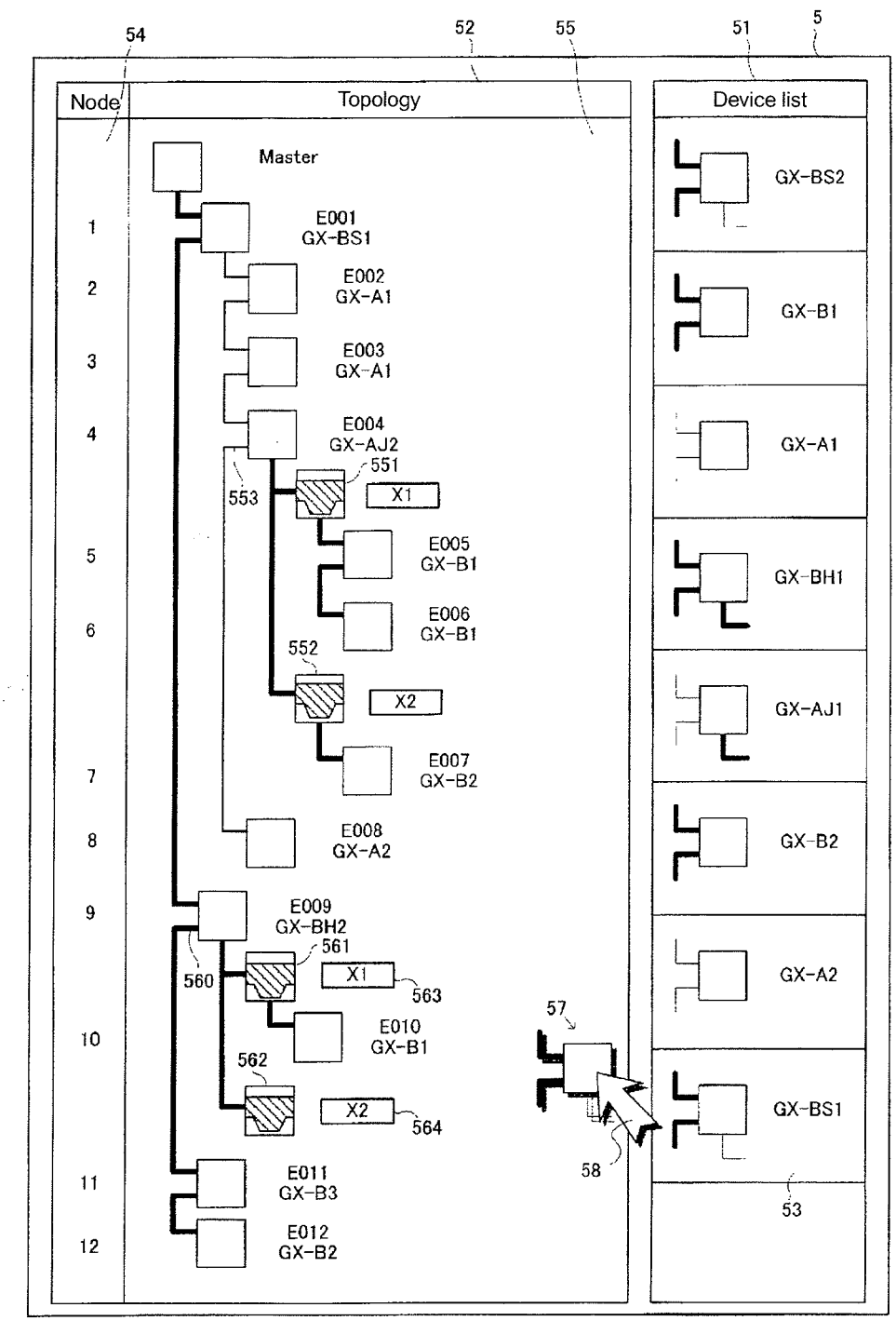
FIG. 4 is another view showing the one example of the design assistance GUI generated by the design assistance system according to the embodiment.

In a GUI generated by the design assistance system of the present embodiment, the user can add a slave device to or delete it from a network system under design by performing drag-and-drop operations on the device components in a direction from the device list display screen 51 to the topology display screen 52 or in the opposite direction. In FIG. 4, a to-be-added device component 57 represents a device component being dragged by the user from the device list display screen 51 to the topology display screen 52. The to-be-added device component 57 being dragged is indicated by a following pointer 58 that moves as the user operates the mouse.

The to-be-added device component 57 being dragged is provided with line components which are shown to represent ports, as shown in the figure. Accordingly, the user can easily know the number of the ports and the connection interfaces provided to the slave device (referred to as to-be-added slave device) which is represented by the to-be-added device component 57 being dragged. The GUI well suitably assists the user when the user drops the device component to an appropriate position (where a device component or a port component is displayed which respectively represents a slave device or a port to which the to-be-added slave device can be connected) on the topology display screen 52.

Since the line components are displayed in different aspects in accordance with different types of the port connection interface on the topology display screen 52, the user can easily know which one of the connection interfaces is used to connect each of the apparatuses of a network system under design. Therefore, when newly adding a slave device to the network system under design, the user can easily know beforehand which slave device including what kind of connection interface port is selected.

Moreover, the design assistance system of the present embodiment has the following design assistance mechanism.

If operations (for example, mouse clicking or keyboard cursor key operations) are performed by the user to select any one of device components enumerated on the device list display screen 51, the design assistance system changes the aspect of displaying the device components and the port components respectively representing slave devices and ports to which a slave device (referred to as selected slave device) represented by the device component selected on the device list display screen 51 cannot be connected, among those device components and the port components that compose the topology display screen 52. In the present embodiment, GUI components representing the slave devices and the ports to which the selected slave device cannot be connected is grayed out (by which colorfulness of an icon component or a text component is degraded) on the topology display screen 52. Moreover, the user is prevented from selecting the grayed-out device component and port component as a drop destination of the device component.

Such a display aspect is controlled by permitting the generation section 34 to acquire information indicating the types of connection interfaces of the ports provided to the selected slave device and information indicating the types of the ports provided to slave devices (referred to as configuration slave devices) represented by the device components composing the topology display screen 52 and the types of the connection interfaces of the ports represented by the port components composing the topology display screen 52 from the acquisition section 32, decide whether the selected slave device can be connected for each of the configuration slave devices, and identify the configuration slave devices and the ports that cannot be connected to the selected slave device.

Figure 5:
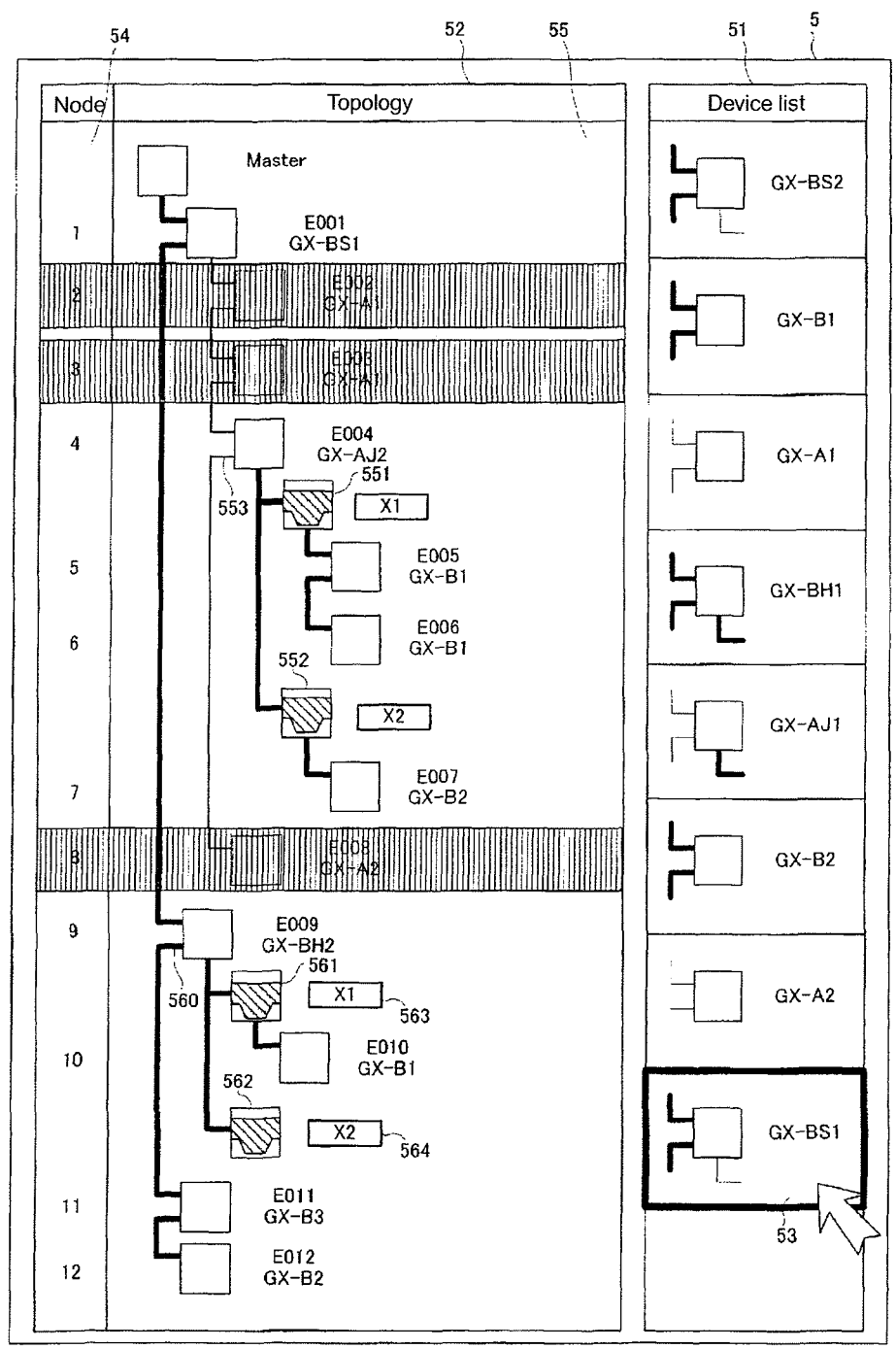
FIG. 5 is a further view showing the one example of the design assistance GUI generated by the design assistance system according to the embodiment.

Since a slave device represented by the device component 531 is connected to an external bus, if, for example, the device component 531 is selected by the user on the device list display screen 51, as shown in FIG. 5, the device components are grayed out which represent the slave devices (E002, E003, E008) other than the slave devices connected to the external bus and the slave devices provided with a branching port for branching to the external bus among those device components composing the topology display screen 52, so that those device components cannot be selected as a drop destination. Accordingly, if the user selects a device component on the device list display screen 51, the user can easily identify to which portion of a network system under design this slave device can be connected and is inhibited from dropping the device component being dragged to an appropriate device component. Due to such design assistance, the user can efficiently perform design work.

Further, if operations to select any one of the device components and the port components composing the topology display screen 52 are performed by the user, the design assistance system changes the aspect of displaying device components representing the slave devices that cannot be connected to the slave device (referred to as selected slave device) represented by the device component or the port (referred to as selected port) represented by the port component which is selected on the topology display screen 52, among those device components enumerated on the device list display screen 51. In the present embodiment, the device components representing the slave devices that cannot be connected to the selected slave device or the selected port are grayed out on the device list display screen 51. Moreover, the grayed-out device components are arranged such that they cannot be selected by the user as a target to be dragged.

Such a display aspect is controlled by permitting the generation section 34 to acquire information indicating the types of connection interfaces of the ports or selected ports provided to the selected slave device and information indicating the types of connection interfaces of the ports provided to slave devices (candidate slave device for addition) represented by the device components enumerated on the device list display screen 51 from the acquisition section 32, decide whether each of the candidate slave devices for addition can be connected to the selected slave device or the selected port, and identify the candidate slave devices for addition that cannot be connected to the selected slave device or the selected port.

Figure 6:
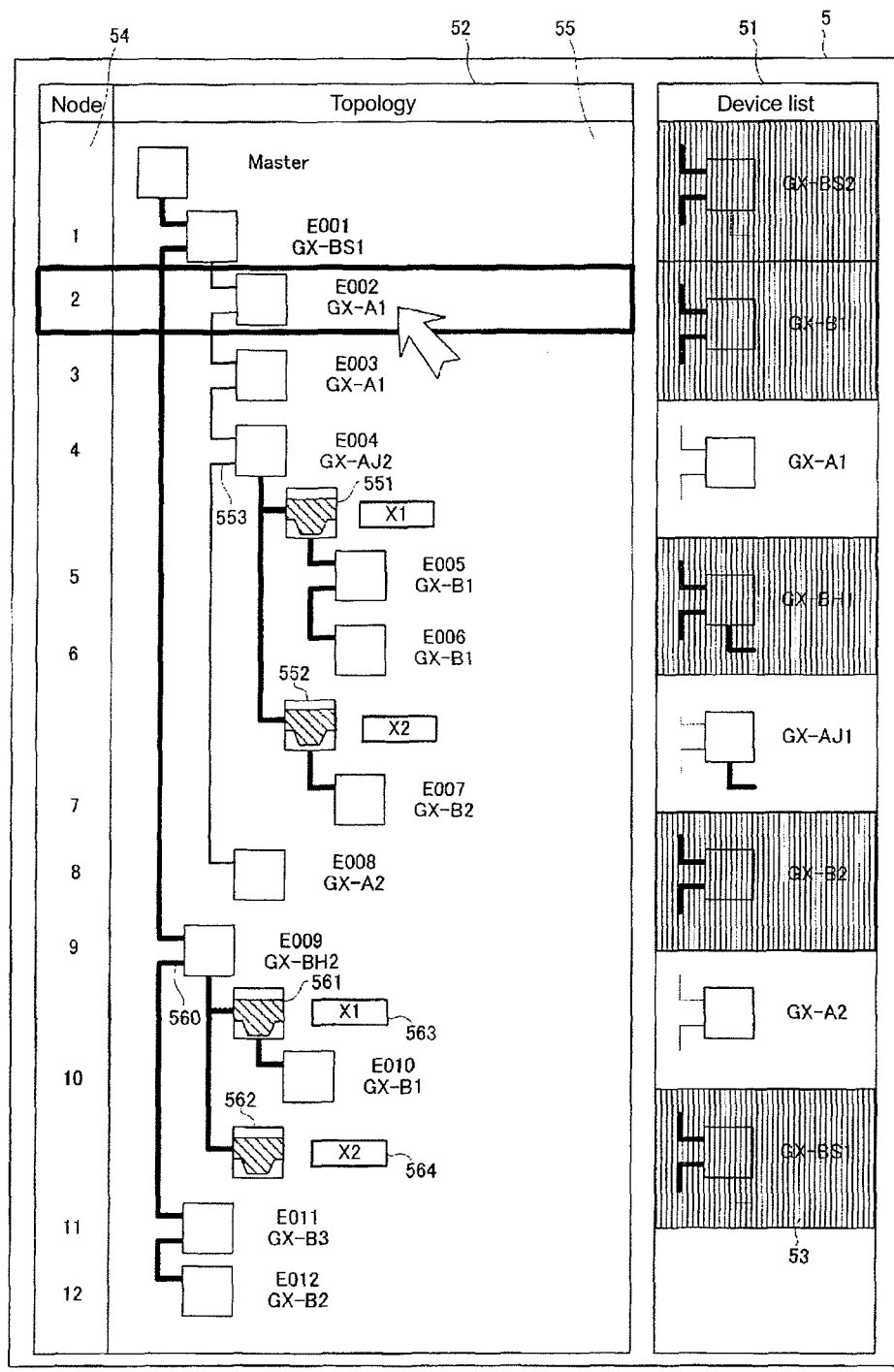
FIG. 6 is a still further view showing the one example of the design assistance GUI generated by the design assistance system according to the embodiment.

Since a slave device represented by the device component E002 is connected to an internal bus, if, for example, the device component E002 is selected by the user on the topology display screen 52, as shown in FIG. 6, the device components are grayed out which represent the slave devices other than the slave devices connected to the internal bus among those device components enumerated on the device list display screen 51, so that those device components cannot be dragged out of the device list display screen 51. For example, since the slave devices represented by the device component 531 are connected to the external bus, the device component 531 is grayed out. Rather than being grayed out, the device component 531 may not to be displayed. In this case, only the device components will be enumerated on the device list display screen 51 which represent slave devices that can be connected to a slave device or a port which is represented respectively by the device component or the port component selected on the topology display screen 52. In either case, if the user selects a GUI component which represents a slave device or port as a desired connection destination on the topology display screen 52, the user can easily know which slave devices can be connected to this connection-destination slave device or port and is inhibited from dragging a device component inappropriate as a target to be dropped to the selected connection-destination device component or port component, out of the device list display screen 51. Due to such design assistance, the user can efficiently perform design work.

If a to-be-added device component is dropped by the user to a device component or port component to which a slave device is already connected on the topology display screen 52, the design assistance system generates the topology display screen 52 indicating that the to-be-added slave device represented by the dropped device component is connected as sandwiched by a connection-destination slave device (or connection port) represented by the drop-destination device component (or port component) and the slave device already connected to this connection-destination slave device (or connection-destination port).

Figure 7:
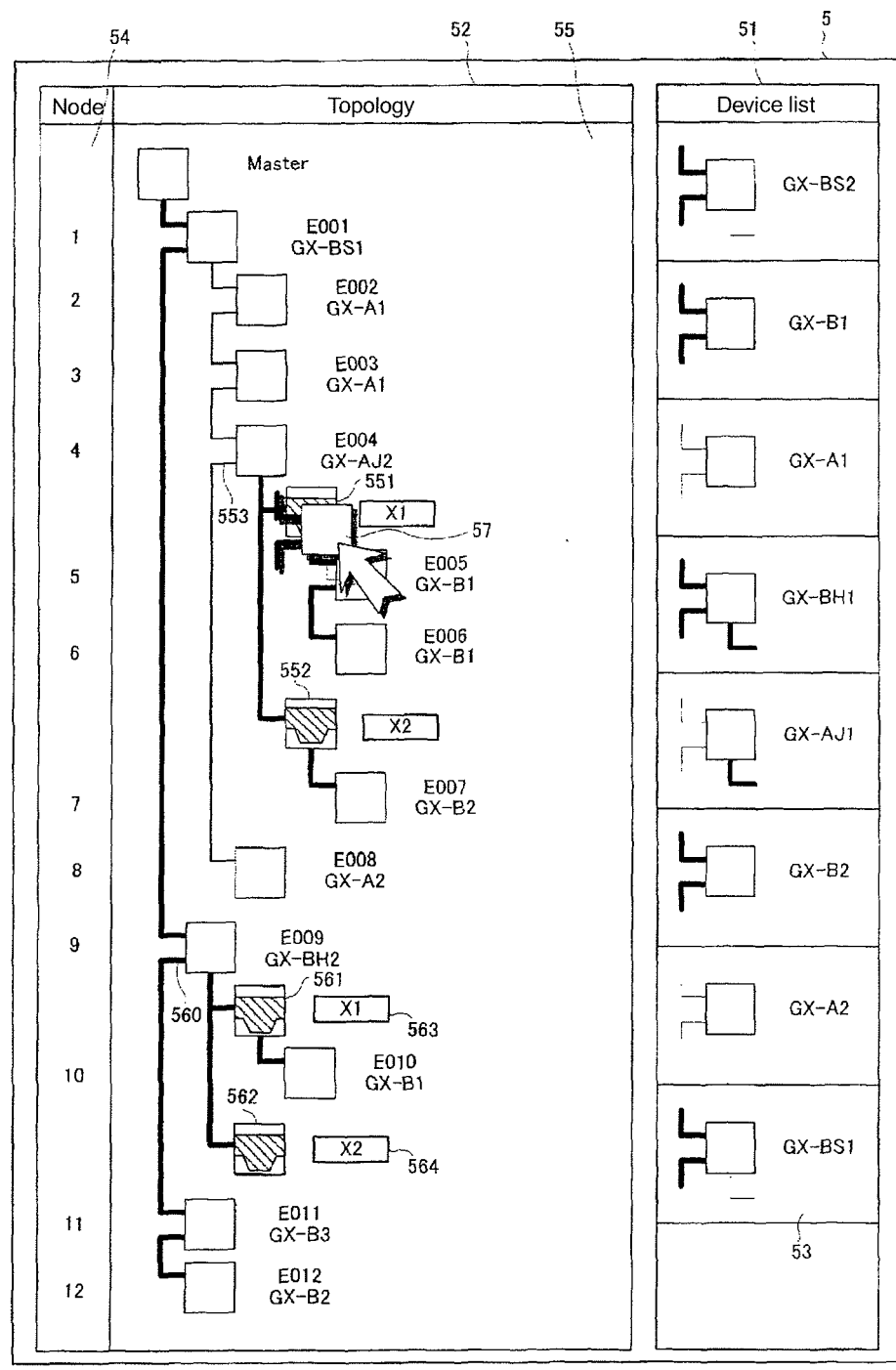
FIG. 7 is a view showing a display example of the GUI in a case where a device component is dropped by a user on a port component to which another device component is already connected on a topology display screen in the design assistance system according to the embodiment.
Figure 8:
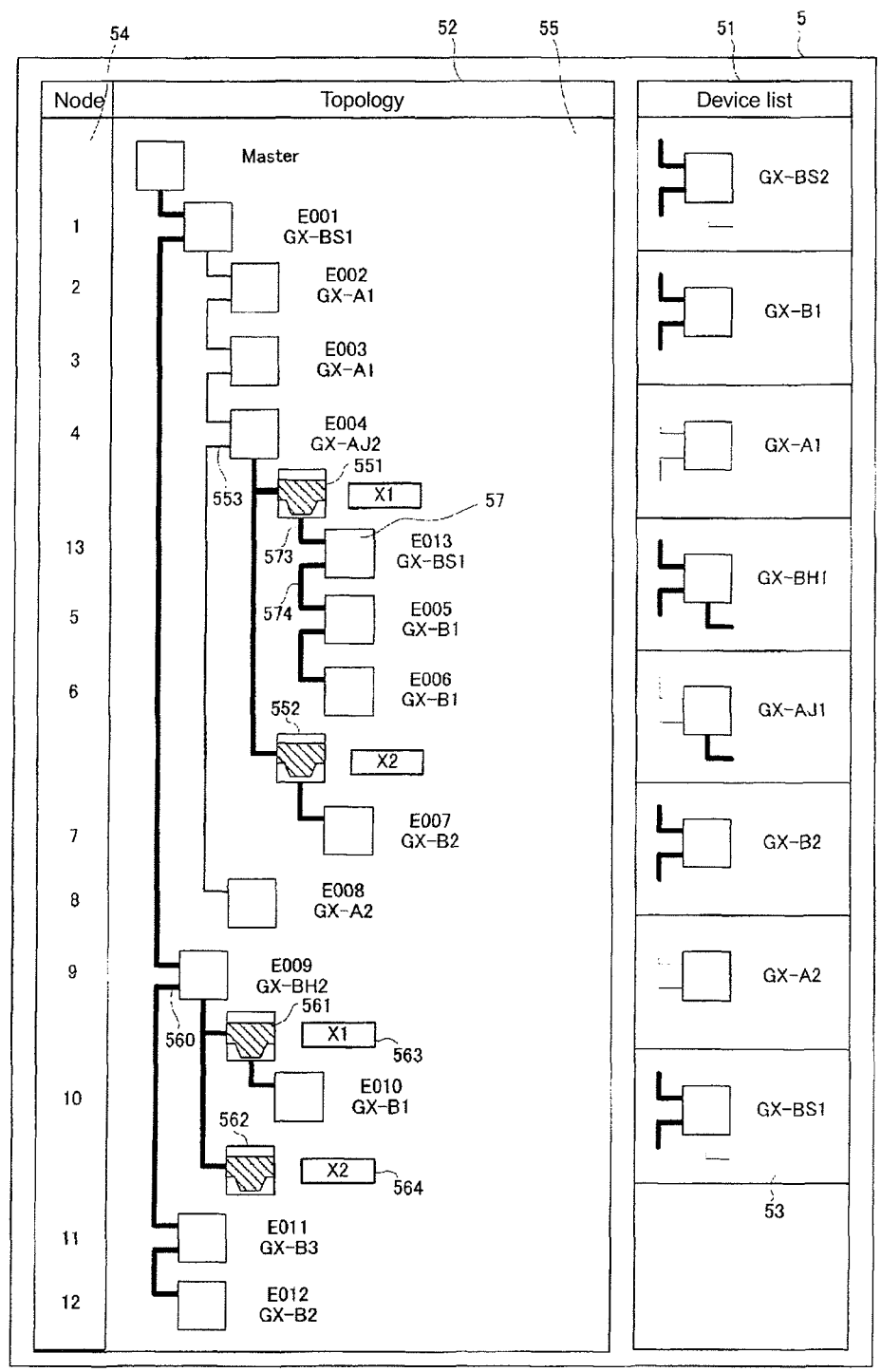
FIG. 8 is a view showing a display example of the topology display screen on which the dropped device component is connected such that the dropped device may be sandwiched by the drop-destination port component and the device component initially connected to this port component, the dropped device component being generated if the device component is dropped by the user on the port component to which another device component is already connected on the topology display screen in the design assistance system according to the embodiment.

For example, FIG. 7 shows a display example of a GUI in a case where the to-be-added device component 57 is dropped by the user on the port component 551. In this example, since the device component E005 is already connected to the port component 551, the design assistance system disposes the to-be-added device component 57 on a row immediately below the port component 551 to interconnect the to-be-added device component 57 and the port component 551 with a line component 573 and disposes the device component E005 on a row immediately below the to-be-added device component 57 to interconnect the device component E005 and the to-be-added device component 57 with a line component 574, as shown in FIG. 8. In such a manner, the design assistance system generates the topology display screen 52 indicating that a first branching port X1 of the slave device E004 represented by the port component 551 is connected to an inport of the added slave device and an outport of the added slave device is connected to an inport of the slave device E005.

Figure 9:
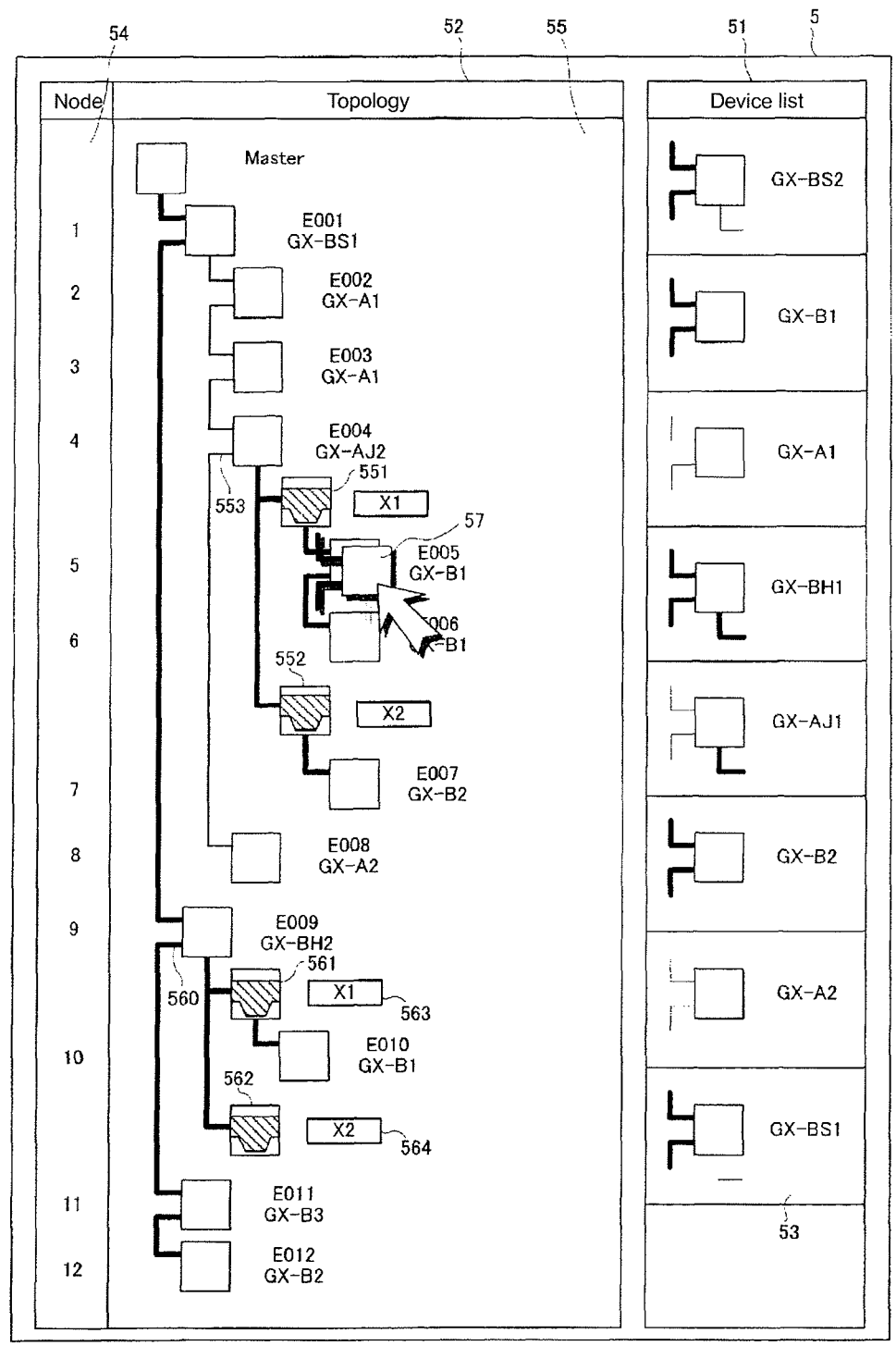
FIG. 9 is a view showing a display example of the GUI in a case where the device component is dropped by the user on a device component to which another device component is already connected on the topology display screen in the design assistance system according to the embodiment.
Figure 10:
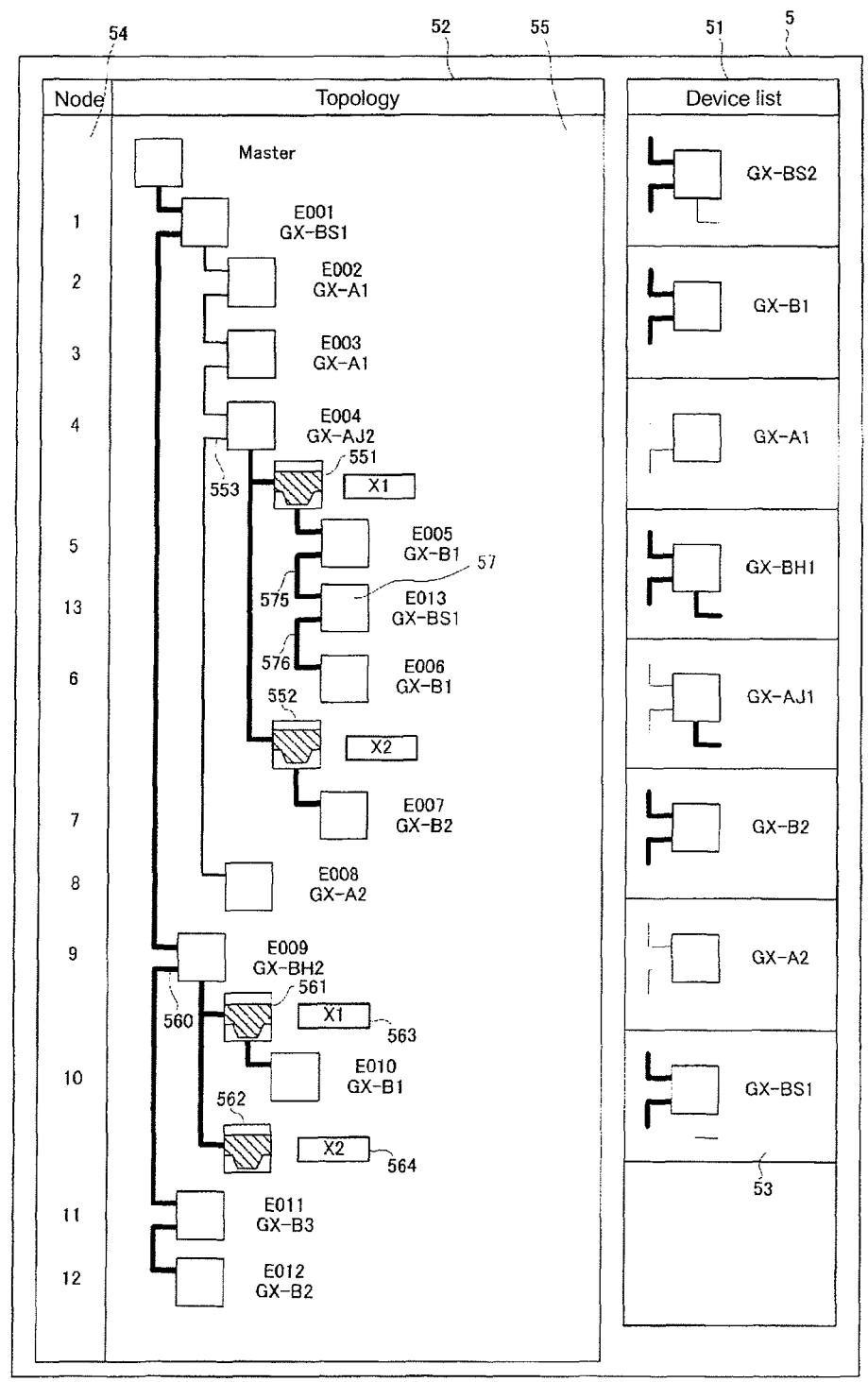
FIG. 10 is a view showing a display example of the topology display screen on which the dropped device component is connected such that the dropped device may be sandwiched by the drop-destination device component and the device component initially connected to this device component generated if the device component is dropped by the user on the device component to which another device component is already connected on the topology display screen in the design assistance system according to the embodiment.

Further, FIG. 9 shows a display example of a GUI in a case where the to-be-added device component 57 is dropped by the user on the device component E005. In this example, since the device component E006 is already connected to the device component E005, the design assistance system disposes the to-be-added device component 57 on a row immediately below the device component E005 to interconnect the to-be-added device component 57 and the device component E005 with a line component 575 and disposes the device component E006 on a row immediately below the to-be-added device component 57 to interconnect the device component E006 and the to-be-added device component 57 with a line component 576, as shown in FIG. 10. In such a manner, the design assistance system generates the topology display screen 52 indicating that an outport of the slave device E005 is connected to an inport of the added slave device and an outport of the added slave device is connected to an inport of the slave device E006.

In the case of controlling the aspect of displaying the device components (displayed device components) composing the topology display screen 52 or the device list display screen 51 in accordance with a possibility of connection with the user-selected device component (selected device component), it may be possible to take into consideration not only the possibility of interconnection between the slave device represented by the displayed device component and the slave device represented by the selected device component but also the possibility of interconnection between the slave device already connected to the slave device represented by the displayed device component and the slave device represented by the selected device component.

For example, if the device component representing a parent slave device to which a child slave device is already connected or the port component representing a port provided to the parent slave device to which the child slave device is already connected is selected by the user on the topology display screen 52, the device components are grayed out on the device list display screen 51 which represent the slave devices other than the slave devices that have an inport connectable to an outport of this parent slave device and also have an outport or branching port to which an inport of the child slave device can be connected.

Further, if any device component is selected by the user on the device list display screen 51, the aspect of displaying the device components and port components to which the slave device is already connected among those device components and port components that compose the topology display screen 52 is controlled by graying out the device components on the topology display screen 52 which represent the slave devices other than those slave devices that have the outport or branching port to which the inport of the selected device component can be connected and also have the inport to which the outport of the selected device component to which the slave device is already connected can be connected.

Figure 11:
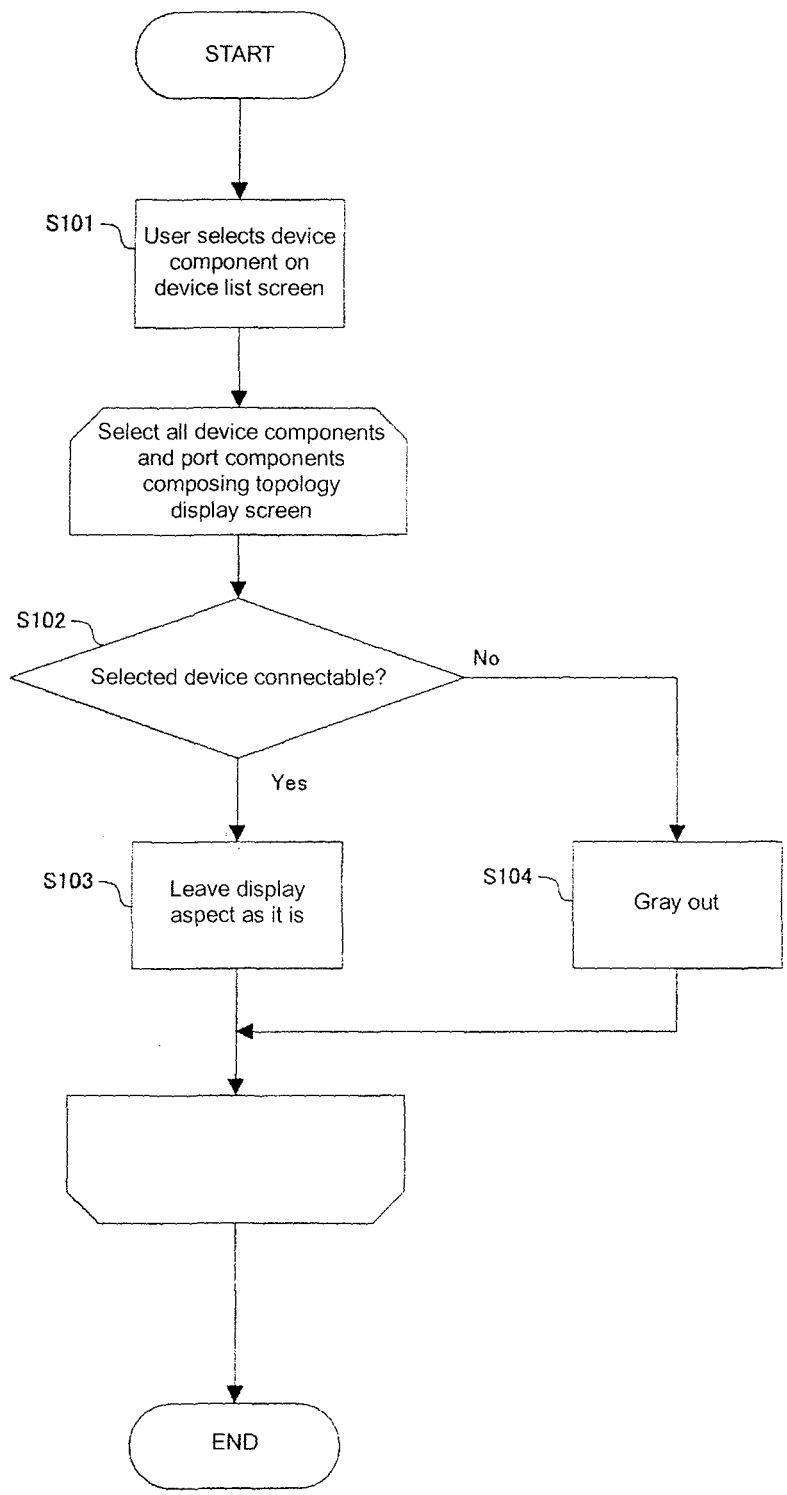
FIG. 11 is a flowchart showing processing which is performed in a case where any one of the device components enumerated on a device list display screen is selected by the user in the design assistance system according to the embodiment.

FIG. 11 is a flowchart showing processing which is performed in a case where any one of the device components enumerated on the device list display screen 51 is selected by the user in the design assistance system of the present embodiment.

If information about user operations performed in S101 to select any device component on the device list display screen 51 is input from the input section 33, the generation section 34 decides in step S102 whether a slave device (selected slave device) represented by the device component selected by the user on the device list display screen 51 can be connected to each of slave devices and ports (configuration slave devices and configuration ports) represented by the device components and port components composing the topology display screen 52. The decision processing is performed by permitting the generation section 34 to acquire information of the types of connection interfaces of the ports or configuration ports provided to the configuration slave device and information of the types of connection interfaces of the ports provided to the selected slave device from the acquisition section 32 and compare the acquired pieces of information. The acquisition section 32 acquires the slave information data of the slave device provided with the configuration slave device or configuration port from the storage section 31 and acquires the information of the types of connection interfaces of the ports from the acquired slave information data and transmits the acquired information to the generation section 34.

The aspect of displaying, on the topology display screen 52, the device components (or port components) representing the configuration slave devices (or configuration ports) on which it is decided that the selected slave device can be connected to the configuration slave devices are left unchanged (step S103). The device components (or port components) representing the configuration slave devices (or configuration ports) on which it is decided that the selected slave device cannot be connected to the configuration slave devices are grayed out in the display aspect on the topology display screen 52 (step S104). If decision and display aspect alteration end on all of the device components and port components that compose the topology display screen 52, the generation section 34 ends the processing.

Figure 12:
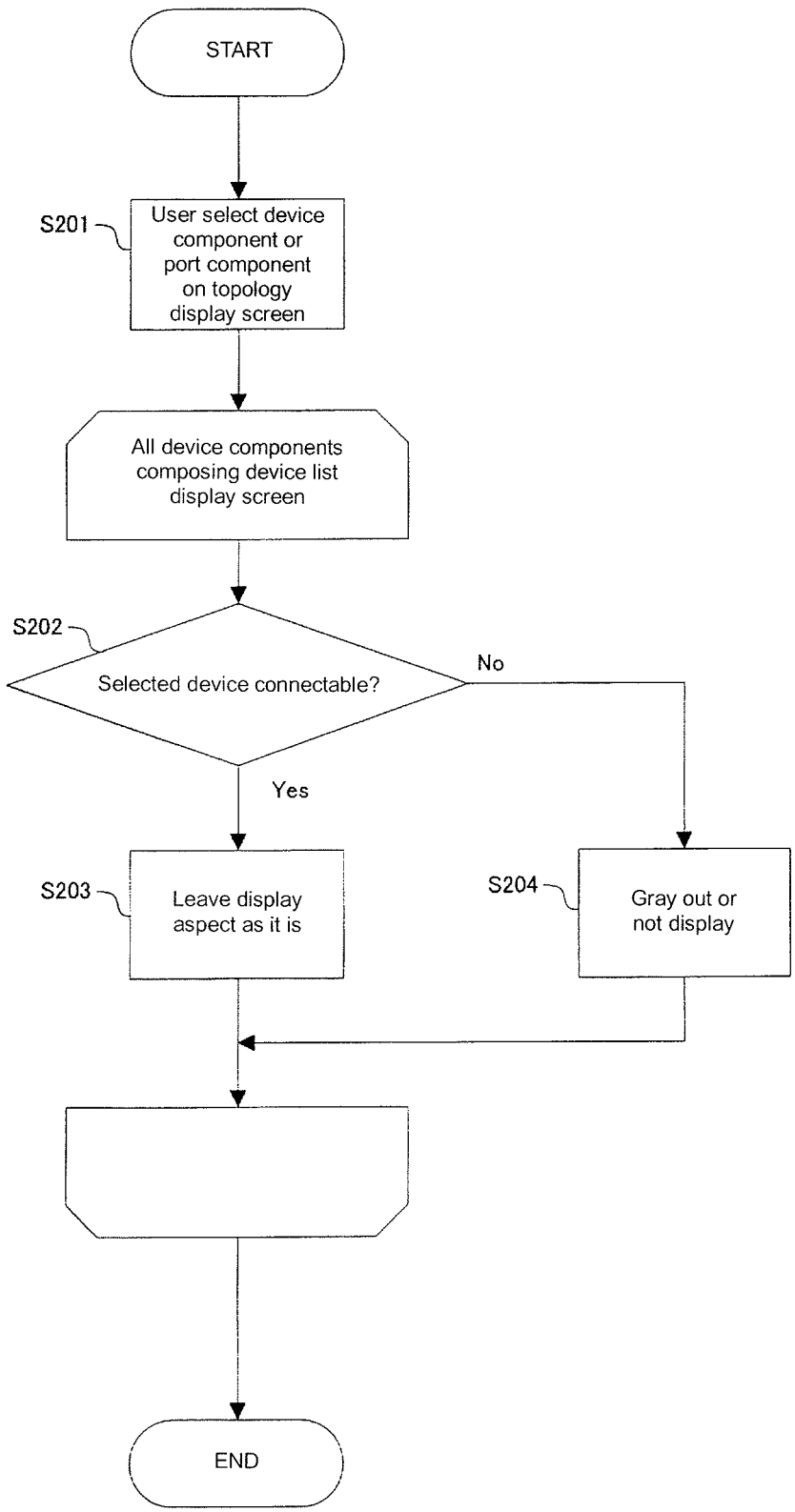
FIG. 12 is a flowchart showing processing which is performed in a case where any one of the device components and the port components on a topology display screen is selected by the user in the design assistance system of the embodiment.
Figure 13:
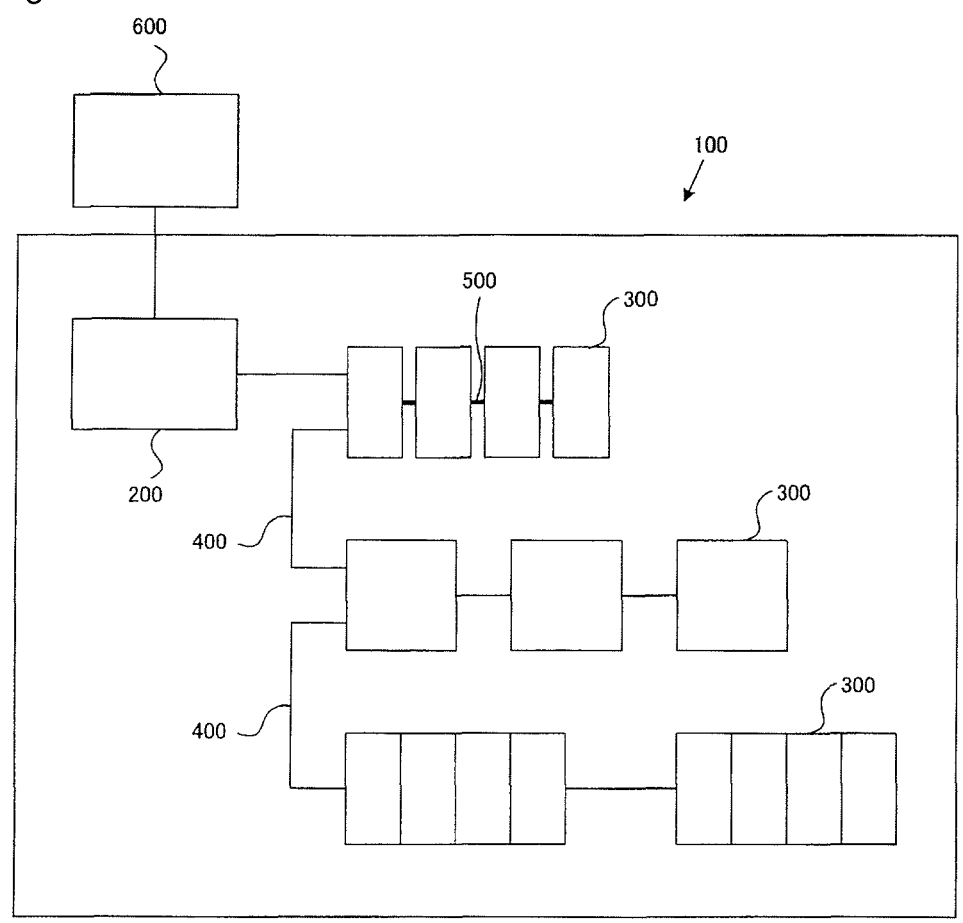
FIG. 13 is a diagram showing a configuration example of a typical field network.

FIG. 12 is a flowchart showing processing which is performed in a case where any one of the device components and port components that compose the topology display screen 52 is selected by the user in the design assistance system of the embodiment.

If information about user operations performed in S201 to select any device component or port component on the topology display screen 52 is input from the input section 33, the generation section 34 decides in step S202 whether each of slave devices (candidate slave devices for addition) represented by the device components enumerated on the device list display screen 51 can be connected to a slave device (selected slave device) represented by the device component and a port (selected port) represented by the port component which are selected by the user on the topology display screen 52. The decision processing is performed by permitting the generation section 34 to acquire information of the types of connection interfaces of the ports provided to the candidate slave device for addition and information of the types of connection interfaces of the ports or selected ports provided to the selected slave device from the acquisition section 32 and compare the acquired pieces of information. The acquisition section 32 acquires the slave information data of the candidate slave device for addition and the slave information data of the slave device provided with the selected slave device or selected port from the storage section 31 and acquires the information of the types of connection interfaces of the ports from the acquired slave information data and transmits the acquired information to the generation section 34.

The aspect of displaying, on the device list display screen 51, the candidate slave devices for addition on which it is decided that they can be connected to the selected slave device (or selected port) is left unchanged (step S203). The candidate slave devices for addition on which it is decided that they cannot be connected to the selected slave device (or selected port) are grayed out on the device list display screen 51 or arranged not to be displayed on the device list display screen 51 (step S204). If decision and display aspect alteration end on all of the device components enumerated on the device list display screen 51, the generation section 34 ends the processing.

According to the design assistance system of the present embodiment, the aspect of displaying the device components and the port components on the device list display screen or the topology display screen is controlled in accordance with which device component or port component is selected by the user on the device list display screen or the topology display screen, so that the user can easily know the connectability of the selected slave devices. Therefore, due to the design assistance system of the present embodiment, the user can further efficiently design a network system.

As described above, in the design assistance system of the present embodiment, the generation section may generate device components containing GUI components representing the number of the ports provided to the slave device and the types of the connection interfaces.

Thus, the user can know the number of the ports provided to the slave device and the types of the connection interfaces represented by device components only by watching those device components. Therefore, even a user having no expert knowledge or experiences can design a network system without, for example, referencing documents to check the specifications of the slave devices or asking for SE's advice.

In the design assistance system of the invention, the generation section generates a device list display screen displaying a list of device components representing slave devices which can be newly joined to a network system under design and also generates a design assistance GUI containing a topology display screen and the device list display screen, so that if operations to select any one of the device components enumerated on the device list display screen are performed by the user, the generation section may change the aspect of displaying the device components representing the slave devices to which the slave device represented by the device component selected on the device list display screen cannot be connected among the device components composing the topology display screen.

Thus, the user can easily know on the topology display screen the slave devices and ports to which a slave device represented by the device component selected on the device list display screen can be connected. In the case of a network system in which a plurality of types of communication buses are mixed, there are some cases where a slave device selected by the user cannot be joined depending on the join-destination communication bus. However, by the design assistance system having the configuration described above, if the user selects a slave device desired to be joined, the user can easily know the communication bus or the slave device that cannot be selected as a destination to which this slave device joins, so that useless trials and errors can be suppressed to enable facilitating network design.

In the configuration described above, the generation section may generate a topology display screen on which the user cannot select the device component or port component whose display aspect is changed as the destination onto which the device component is dropped. Thus, the user can be inhibited from dropping a device component selected on the device list display screen to the device component or port component which is not appropriate as the drop destination, so that efficient design can be performed.

In the design assistance system of the invention, the generation section generates a device list display screen displaying a list of device components representing slave devices which can be newly joined to a network system under design and also generates a design assistance GUI containing a topology display screen and the device list display screen, so that if operations to select any one of the device components enumerated on the topology display screen are performed by the user, the generation section may change the aspect of displaying the device components representing the slave devices to which the slave device represented by the device component selected on the topology display screen cannot be connected among the device components enumerated on the device list display screen.

Thus, the user can easily know on the device list display screen the slave devices which can be connected to the slave devices and ports represented by the respective device component and port components selected on the topology display screen. In the case of a network system in which a plurality of types of communication buses are mixed, the slave devices are divided into those that can be joined and those that cannot be done so depending on the slave devices and the join-destination communication buses which are selected by the user. By the design assistance system having the configuration described above, if a join-destination communication bus or slave devices are selected by the user, the user can easily know the slave devices that cannot be joined to the join-destination communication bus, so that useless trials and errors are suppressed, to enable facilitating network system design.

In the configuration described above, a device list display screen may be generated on which the user cannot select device components whose display aspect is changed as a target to be dragged. Thus, the user can be inhibited from dragging out a device component not appropriate as that to be dropped onto a device component or port component selected on the topology display screen from the device list display screen, so that efficient design can be performed.

DESCRIPTION OF SYMBOLS

1: Design assistance system
2: Display
3: PC
4: Input device
5: Design assistance GUI
31: Storage section
32: Acquisition section
34: Generation section
51: Device list display screen
52: Topology display screen

The invention claimed is:

1. A control device of a design assistance system for assisting design of a network system in which a master device and at least one slave device are connected to a communication bus to communicate with each other, the network system being formed by interconnecting ports of the master and at least one slave devices, the control device comprising:
a storage that stores instructions and slave information data, the slave information data including unique information of the at least one slave device; and
a processor that, when executing the instructions stored in the storage, performs a process comprising:
acquiring information of a connection interface of a port of the at least one slave device from the slave information data stored in the storage;
generating a device component, serving as a GUI component, representing the at least one slave device based on the slave information data;
generating a line component, serving as a GUI component, representing connection of the port of the at least one slave device, the line component having different display aspects in accordance with different types of the connection interface;
generating a design assisting GUI having a topology display screen, the topology display screen displaying a topology of the network system under design, the network system under design including a first device component indicating a first slave device and a second device component indicating a second slave device; and modifying the network system under design by adding a compatible device component to the network system under design, wherein the design assigning GUI further includes a display list of device components, representing slave devices that are configured to be added to the network system under design, and the processor, when executing the instructions stored in the storage, further performs a process comprising:

when a user selects a target device component from the device components in the display list to connect with one of the first device component and the second device component of the network system under design, changing a display feature of the first device component to be different than a display feature of the second device component to indicate design incompatibility of the first device component with the target device, the first device component being incompatible with the target device and the second device component being compatible with the target device.

2. The control device according to claim 1, wherein the display feature of the first device component is shaded, and the display feature of the second device component is not shaded.

3. The control device according to claim 1, wherein the display aspects of the line component are different in at least one of color, thickness and line type.

4. A control device of a design assistance system for assisting design of a network system in which a master device and at least one slave device are connected to a communication bus to communicate with each other, the network system being formed by interconnecting ports of the master and at least one slave devices, the control device comprising:

a storage that stores instructions and slave information data, the slave information data including unique information of the at least one slave device; and a processor that, when executing the instructions stored in the storage, performs a process comprising:

acquiring information of a connection interface of a port of the at least one slave device from the slave information data stored in the storage;

generating a device component, serving as a GUI component, representing the at least one slave device based on the slave information data;

generating a line component, serving as a GUI component, representing connection of the port of the at least one slave device, the line component having different display aspects in accordance with different types of the connection interface;

generating a design assisting GUI having a topology display screen, the topology display screen displaying a topology of the network system under design, the network system under design including a first device component indicating a first slave device and a second device component indicating a second slave device; and modifying the network system under design by adding a compatible device component to the network system under design, wherein the design assigning GUI further includes a display list of device components, representing slave devices that are configured to be added to the network system under design, and the processor, when executing the instructions stored in the storage, further performs a process comprising:

when a user selects a target device component from the one of the device components displayed on the topology display screen to connect with one of the first device component and the second device component of the network system under design, changing a display feature of the first device component in the display list to be different than a display feature of a second device component in the display list to indicate design incompatibility of the first device component with the target device, the first device component being incompatible with the target device and the second device component being compatible with the target device.

5. The control device according to claim 4, wherein the display feature of the first device component is shaded in gray, and the display feature of the second device component is not shaded.

6. The control device according to claim 4, wherein the display aspects of the line component are different in at least one of color, thickness and line type.

7. The control device according to claim 1, wherein, in the topology display screen of the design assisting GUI, the first device component is displayed so as to be disabled from being a connection destination of the selected device component in the display list.

8. The control device according to claim 4, wherein, in the display list of the design assisting GUI, the first device component is displayed so as to be disabled from being connected to the selected device component in the topology display screen.

9. The control device according to claim 1, wherein, in the generating of the device component, the generated device component includes a GUI component which represents a number of ports on each of the at least one slave device and the type of connection interface.

10. A design assistance system comprising:
the control device according to claim 1;
a display that displays the design assisting GUI; and
an input device that permits a user to input a command to operate the design assisting GUI.

11. A non-transitory computer readable recording medium storing a program for assisting design of a network system in which a master device and at least one slave device are connected to a communication bus to communicate with each other, the network system being formed by interconnecting ports of the master and at least one slave devices, the program, when executed by a computer, causing the computer to perform a process comprising:

storing slave information data including unique information of the at least one slave device;

acquiring information of a connection interface of a port of the at least one slave device from the stored slave information data;

generating a device component, serving as a GUI component, representing the at least one slave device based on the slave information data;

generating a line component, serving as a GUI component, representing connection of the port of the at least one slave device, the line component having different display aspects in accordance with different types of the connection interface;

generating a design assisting GUI having a topology display screen, the topology display screen displaying a topology of the network system under design, the network system under design including a first device component indicating a first slave device and a second device component indicating a second slave device; and modifying the network system under design by adding a compatible device component to the network system under design, wherein the design assigning GUI further includes a display list of the device components, representing slave devices that are configured to be added to the network system under design, the program further causing the computer to perform a process comprising:

when a user selects a target device component from the device components in the display list to connect with one of the first device component and the second device component of the network system under design, changing a display feature of the first device component to be different than a display feature of the second device component to indicate design incompatibility of the first device component with the target device, the first device component being incompatible with the target device and the second device component being compatible with the target device.

12. A non-transitory computer readable recording medium storing a program for assisting design of a network system in which a master device and at least one slave device are connected to a communication bus to communicate with each other, the network system being formed by interconnecting ports of the master and at least one slave devices, the program, when executed by a computer, causing the computer to perform a process comprising:

storing slave information data including unique information of the at least one slave device;

acquiring information of a connection interface of a port of the at least one slave device from the stored slave information data;

generating a device component, serving as a GUI component, representing the at least one slave device based on the slave information data;

generating a line component, serving as a GUI component, representing connection of the port of the at least one slave device, the line component having different display aspects in accordance with different types of the connection interface;

generating a design assisting GUI having a topology display screen, the topology display screen displaying a topology of the network system under design, the network system under design including a first device component indicating a first slave device and a second device component indicating a second slave device; and modifying the network system under design by adding a compatible device component to the network system under design, wherein the design assigning GUI further includes a display list of the device components, representing slave devices that are configured to be added to the network system under design, the program further causing the computer to perform a process comprising:

when a user selects a target device component from the one of the device components displayed on the topology display screen to connect with one of the first device component and the second device component of the network system under design, changing a display feature of the first device component in the display list to be different than a display feature of a second device component in the display list to indicate design incompatibility of the first device component with the target device, the first device component being incompatible with the target device and the second device component being compatible with the target device.

13. A design assistance method for assisting design of a network system in which a master device and at least one slave device are connected to a communication bus to communicate with each other, the network system being formed by interconnecting ports of the master and at least one slave devices, the design assistance method comprising:

storing slave information data including unique information of the at least one slave device;

acquiring information of a connection interface of a port of the at least one slave device from the stored slave information data;

generating a device component serving as a GUI component representing the at least one slave device based on the slave information data;

generating a line component, serving as a GUI component, representing connection of the port of the at least one slave device, the line component having different display aspects in accordance with different types of the connection interface;

generating a design assisting GUI having a topology display screen, the topology display screen displaying the topology of the network system under design, the network system under design including a first device component indicating a first slave device and a second device component indicating a second slave device; and modifying the network system under design by adding a compatible device component to the network system under design, wherein the design assigning GUI further includes a display list of device components, representing slave devices that are configured to be added to the network system under design, the method further comprising:

when a user selects a target device component from the device components in the display list to connect with one of the first device component and the second device component of the network system under design, changing a display feature of the first device component to be different than a display feature of the second device component to indicate design incompatibility of the first device component with the target device, the first device component being incompatible with the target device and the second device component being compatible with the target device.

14. A design assistance method for assisting design of a network system in which a master device and at least one slave device are connected to a communication bus to communicate with each other, the network system being formed by interconnecting ports of the master and at least one slave devices, the design assistance method comprising:

storing slave information data including unique information of the at least one slave device;

acquiring information of a connection interface of a port of the at least one slave device from the stored slave information data;

generating a device component serving as a GUI component representing the at least one slave device based on the slave information data;

generating a line component, serving as a GUI component, representing connection of the port of the at least one slave device, the line component having different display aspects in accordance with different types of the connection interface; and generating a design assisting GUI having a topology display screen, the topology display screen displaying the topology of the network system under design, the network system under design including a first device component indicating a first slave device and a second device component indicating a second slave device; and modifying the network system under design by adding a compatible device component to the network system under design, wherein the design assigning GUI further includes a display list of the device components, representing slave devices that are configured to be added to the network system under design, the method further comprising:

when a user selects a target device component from the one of the device components displayed on the topology display screen to connect with one of the first device component and the second device component of the network system under design, changing a display feature of the first device component in the display list to be different than a display feature of a second device component in the display list to indicate design incompatibility of the first device component with the target device the first device component being incompatible with the target device and the second device component being compatible with the target device.

* * * * *